March 19, 1968     S. L. FOREST     3,373,882

BALE LOADING AND STACKING DEVICE

Filed April 14, 1966     7 Sheets-Sheet 1

INVENTOR.
Stanley L. Forest
BY
ATTORNEY.

Stanley L. Forest, INVENTOR.

March 19, 1968   S. L. FOREST   3,373,882
BALE LOADING AND STACKING DEVICE
Filed April 14, 1966   7 Sheets-Sheet 3

Stanley L. Forest, INVENTOR.
BY
ATTORNEY.

March 19, 1968 S. L. FOREST 3,373,882
BALE LOADING AND STACKING DEVICE
Filed April 14, 1966 7 Sheets-Sheet 5

Stanley L. Forest, INVENTOR.

BY
ATTORNEY.

March 19, 1968     S. L. FOREST     3,373,882
BALE LOADING AND STACKING DEVICE
Filed April 14, 1966     7 Sheets-Sheet 6
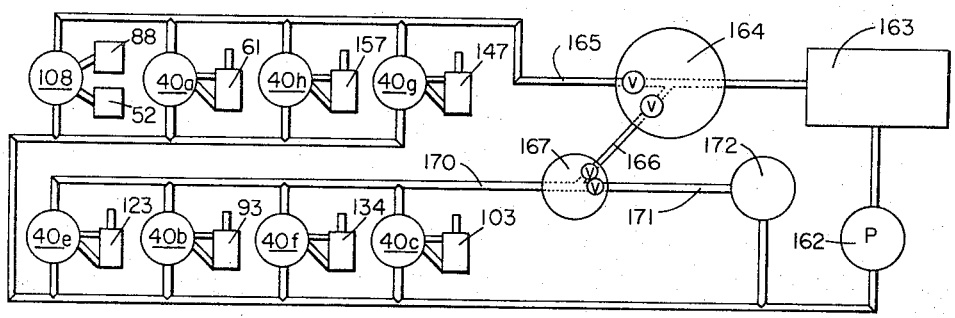
FIGURE 10
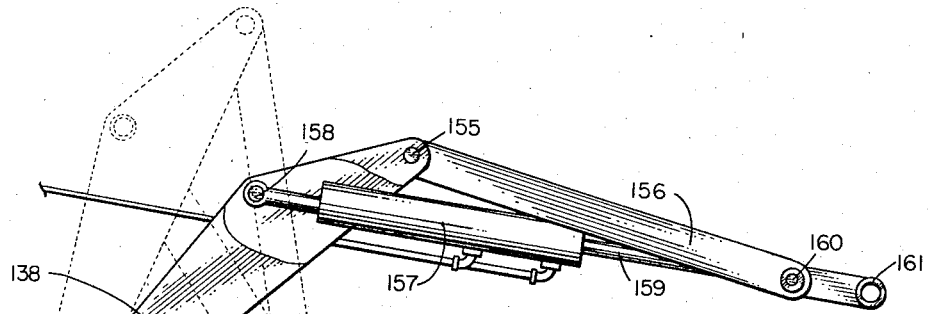
FIGURE 11
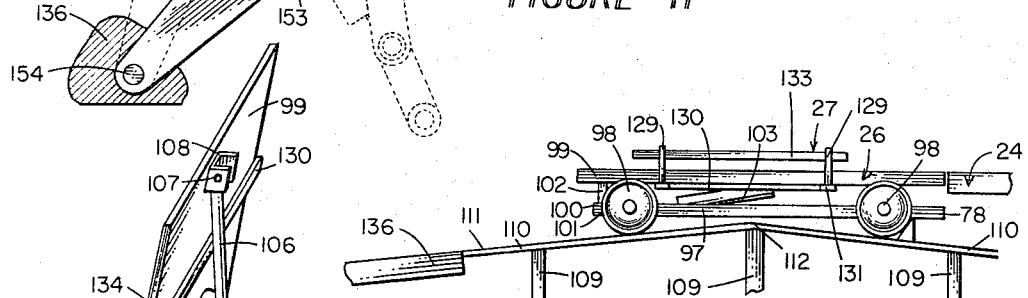
FIGURE 12
FIGURE 13
Stanley L. Forest,
INVENTOR.
BY
ATTORNEY.

March 19, 1968     S. L. FOREST     3,373,882
BALE LOADING AND STACKING DEVICE
Filed April 14, 1966     7 Sheets-Sheet 7
*FIG.14A*
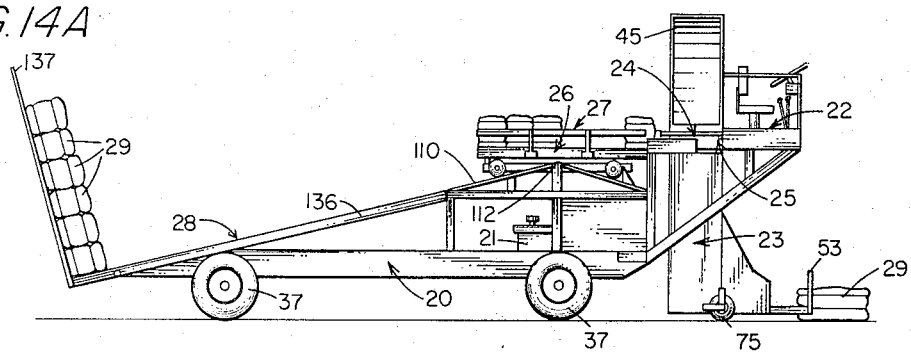
*FIG.14B*
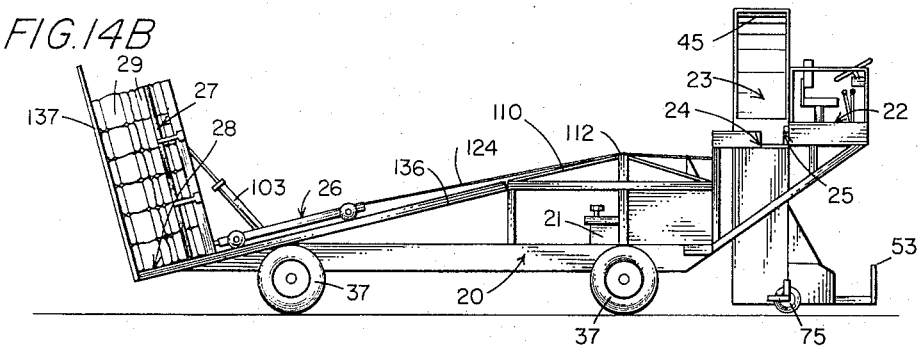
*FIG.14C*
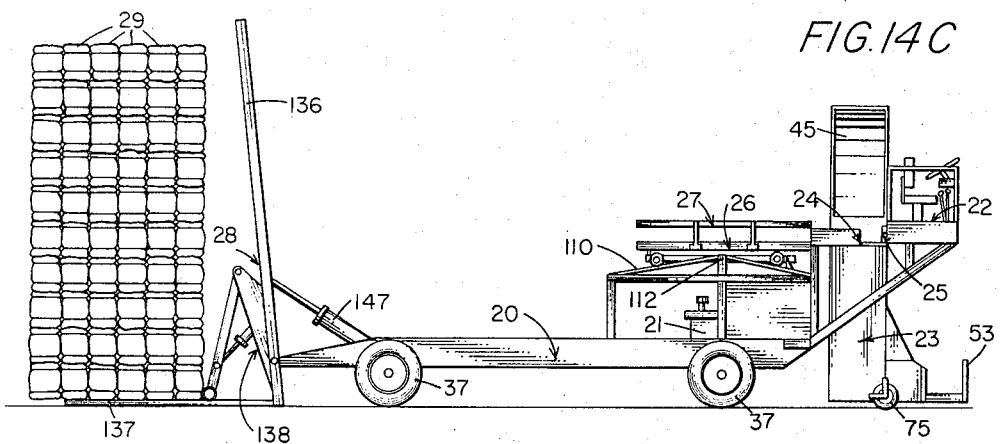
Stanley L. Forest, INVENTOR.
BY 
ATTORNEY.

United States Patent Office 3,373,882
Patented Mar. 19, 1968

3,373,882
BALE LOADING AND STACKING DEVICE
Stanley L. Forest, Royal City, Wash. 99357
Filed Apr. 14, 1966, Ser. No. 542,635
5 Claims. (Cl. 214—6)

This invention relates generally to a vehicle to pick up, transport and stack bales of agricultural products and more particularly to such a vehicle adapted to pick up bales of hay randomly positioned in a field, arrange them in pre-determined order, transport them to a central location, and place the bales in an ordered stack on the ground.

Machines to perform one or more of these functions have in the past become known, but various problems necessarily associated with such machines have been encountered in their use. The instant invention has as its purpose to provide a machine of the combined type that alleviates many of these various problems heretofore encountered. In so doing, it is:

A principal object of my invention to provide a self-powered vehicle, steerable about a field, to automatically pick up bales of agricultural products presented to it.

Another principal object of my invention to provide a vehicle of the nature aforesaid that presents such bales to manually operable facilities carried thereby to arrange such bales in an orderly array for disposition.

Another principal object of my invention to provide such a vehicle that transports bales to a disposition site and there deposits them in ordered stacked array.

A further object of my invention to provide bale handling facilities in such a device of a manually operable, hydraulic type that have no rams, cylinders or push-off devices so located as to be broken upon improper sequencing of operation by an operator.

A further object of my invention to provide such a vehicle that carries stored bales on a rearwardly sloping bed so that the vehicle may operate down hill without tipping over stored bales, and so also as to place the effective center of gravity of transported bales near the rear axles of the vehicle to provide greater traction.

A still further object of my invention to provide such a device with a spring-mounted floating elevator having a spring-loaded equalizer bar to maintain bales therein, both adapted to prevent breakage of bales.

A still further object of my invention to provide such a vehicle with a forward lateral pick-up facility and operation deck high above the ground, so that the operator has complete visability of the operation.

A still further object of my invention to provide a vehicle of overall width within limits required of vehicles to transverse the public highways.

A still further object of my invention to provide a device of the nature aforesaid that is of new and novel design, of economic and durable manufacture, of great and varied use, and otherwise well adapted for its intended purpose.

Further objects and advantages of my invention will appear more fully from the following description and accompanying drawings wherein a specific embodiment of a preferred form of the invention is shown. It should be understood, however, that the drawings and description are illustrative only and are not intended to limit the invention further than as set forth in the accompanying claims.

In the drawings which form a part of this application, and wherein like numbers of reference refer to similar parts throughout:

FIGURE 10 is a diagrammatic representation of the hydraulic powering system of my invention, showing its operation.

FIGURE 11 is a detailed view of the scissor type push-off arm of my invention, showing its operation.

FIGURE 12 is a detailed isometric view of the moveable cart of my invention.

FIGURE 13 is an orthographic side view of the moveable cart and its supporting structure, showing its manner of movement.

FIGURE 14, including diagrams 14a, 14b and 14c, is a semi-diagrammatic representation of the loading and unloading of my invention, showing the various steps thereof.

FIGURE 15 is an isometric view of an ordinary agricultural bale of commerce.

Figure 1:
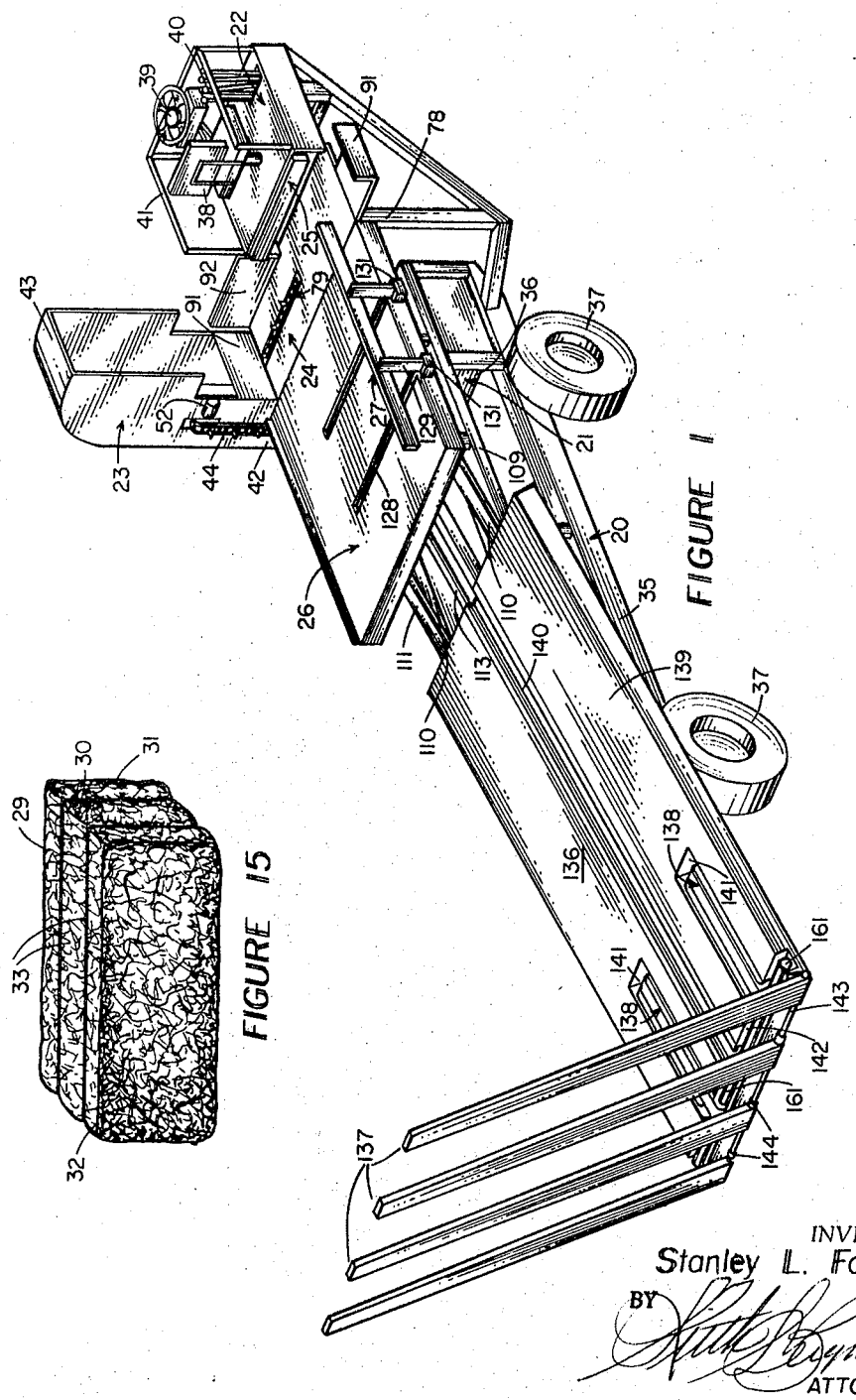
FIGURE 1 is an isometric view of my entire invention, showing in gross its parts, their configuration and relationship.

Referring now to the drawings in more detail and particularly to that of FIGURE 1, it will there be seen that my invention comprises essentially a vehicular frame 20 mounting prime mover 21, to power the vehicle and its various systems; operating deck 22; bale elevator 23; bale transfer deck 24, communicating from the elevator to associated first pusher 25; moveable bale cart 26, with associated second pusher 27; and rearward pivotably mounted bale stacker 28.

To completely understand the operation of the specified embodiment of my invention, the dimensions and configuration of the ordinary rectangular bale of agricultural commerce should be understood. Such a bale 29 is illustrated in FIGURE 15. It is a rectangular solid of approximately square cross-section having a width 30 substantially equal to thickness 31, and a length 32 somewhat greater, usually approximately three times the width. The bale is held together and maintained in this configuration by usually two lengthwise ties 33. Such bales are commonly formed in the field by well known automatic machinery and scattered thereabout in random fashion after the process of formation. It is the purpose of the instant machine to recover such bales from this scattered state, organize them in predetermined fashion and place them for transportation or storage.

Vehicular frame 20 is formed by primary side beams 35 joined by cross members 36. The frame rotatably journals depending pneumatic wheels 37 for locomotion and mounts prime mover 21 in its lower central forward portion for power. The frame construction must be sufficiently heavy to carry the various apparatus of my machine in addition to a load of hay of some several tons.

Operating deck 22 is positioned on the upper forward portion of frame 20, so that the operator thereon will have a clear view of the machine operations and the terrain thereabout. In its central part the operating deck carries pivotably mounted operator's chair 38 and immediately forward thereof steering wheel 39 providing, through an ordinary intermediate hydraulic system, means of steering the vehicle. Various control levers 40 activate members of the hydraulic control system of the invention as later described. For safety of the operator a peripheral railing 41 is provided about the outwardly facing edges of the operating deck.

Figures 4, 5:
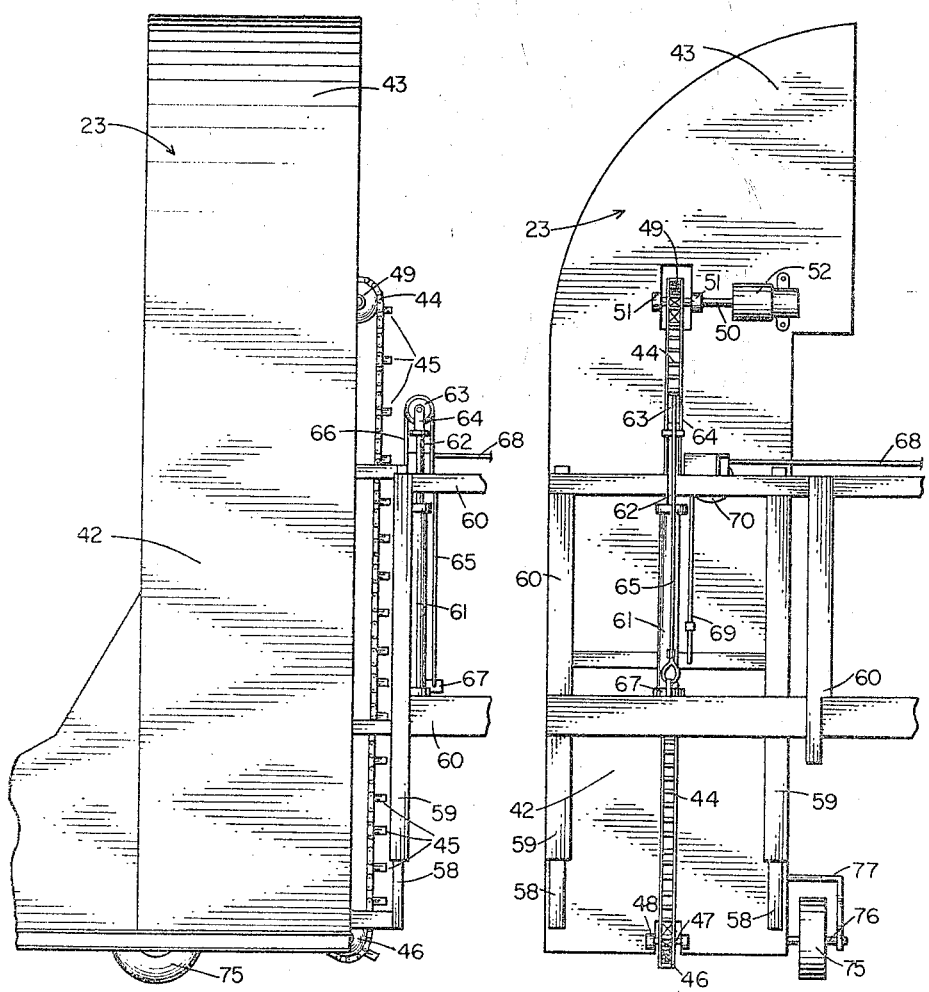
FIGURE 4 is a side elevation of the floating elevator of my invention, showing its structure in detail.
FIGURE 5 is a rear elevation of the same elevator as shown in FIGURE 4, showing its details from this aspect.

Bale elevator 23 is best shown in the detailed drawings of FIGURES 4 and 5. The elevator includes vertical housing 42 capped by the laterally inwardly curving hood 43 together defining a chanel for directed bale motion. The size of this channel should be such as to allow bales to move freely therethrough, such motion being accomplished by means of endless cog chain 44 having perpendicular forwardly projecting dogs 45 adapted to catch physically within the structure of the bale to move it. Chain 44 is carried upon idler cog 46 journaled on shaft 47 rotatably carried by bearings 48 positioned in the lower central part of the rear side of housing 42. The upper portion of the chain is carried by driving cog 49 irrotatably mounted on shaft 50 which in turn is rotatably journaled in bearings 51 and driven by operatively communicating elevator hydraulic motor 52. Chain 44 is so positioned that it runs upwardly against the forward side of the rearward wall of housing 42 and returns downwardly on the exterior or rearward side of this wall, appropriate orifices therefor being provided therein.

Figure 2:
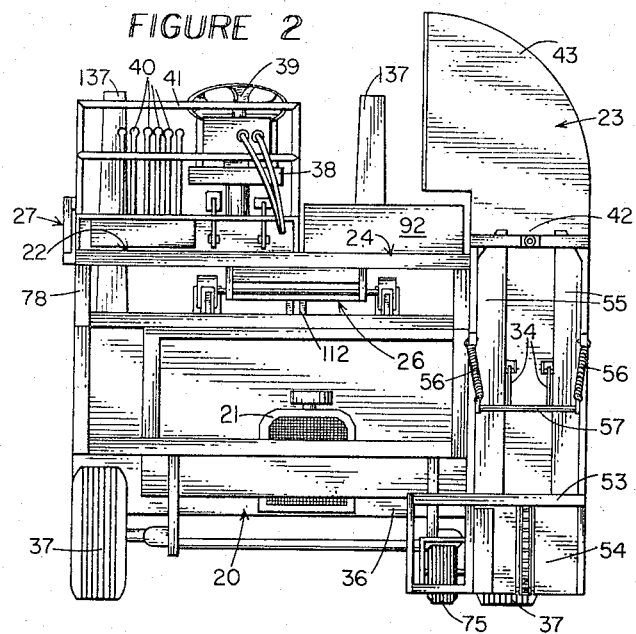
FIGURE 2 is an orthographic front view of the invention shown in FIGURE 1.

As seen in FIGURE 2, forwardly extending pick up bars 53, outwardly flared in their forward extension, communicate with the lower forward portion of elevator housing 42, to direct bales into the forward chute opening 54 upon forward progression of the machine. A pressure bar 55, biased by extension springs 56 cooperating with forwardly projecting spring bar 57 pivotably attached to the pressure plate by straps 34, biases this member to an inward position to maintain bales in housing 42 in contact with dogs 45 of chain 44, so that these bales will follow upwardly in the elevator channel in response to motion of the chain. The upper hood of the elevator is turned laterally toward transfer deck 24 of the machine so that when bales pass lengthwise upwardly in the elevator, they will be deposited on the transfer deck by reason of the hood's curvature, on one side with their length substantially transverse to the machine.

The entire elevator assembly 23 is of a floating type having paired, opposed vertical mounting rails 58 structurally communicating with elevator housing 42 and similar mating paired, opposed channels 59, adapted to slideably engage rails 58, carried upon the secondary frame member 60 in turn carried by vehicular frame 20 to mount the elevator on the forward lateral part of the vehicular frame.

A double-acting hydraulic cylinder 61 is mounted in secondary frame 60 to provide vertical motion to the elevator. Piston shaft 62 of this cylinder carries in its uppermost extensoin sheave 64 rotatably mounting pulley 63. Cable 65, with end 66 fastened to mounting rails 58 on housing 42, passes over pulley 63 and downwardly to end 67 fastened rigidly to the secondary frame 60. With this structure, hydraulic cylinder 61 may be activated by control 40a on the operation deck to extend upwardly to raise elevator 23 or downwardly to lower it, aided of gravity.

Figure 6:
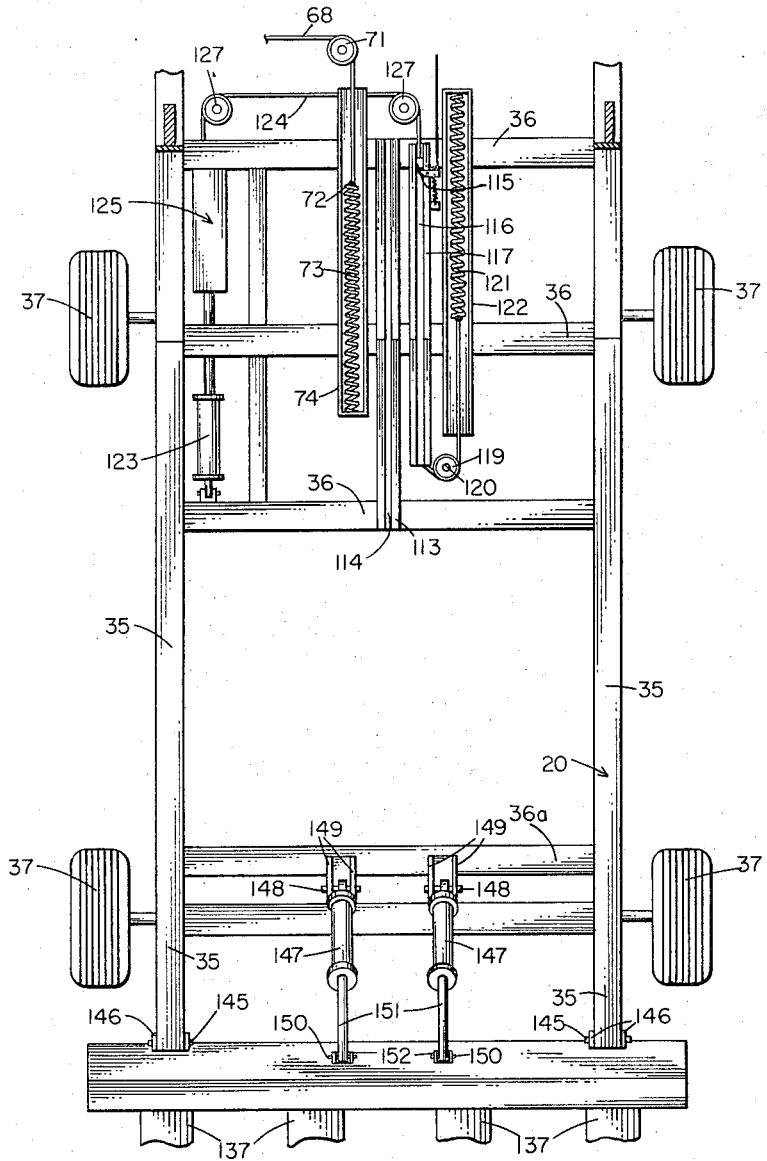
FIGURE 6 is a partial, cutaway top view of the rear stacking portion of my invention, showing its structure and the various mechanisms associated therewith.

As shown principally in FIGURES 5 and 6, a secondary tensioning system to absorb minor motions, such as caused by rocks, holes or similar features in the terrain being traversed, is provided by cable 68 fastened rigidly at end 69 to mounting rail frame 58 of housing 42 and passing thence over first angling pulley 70 to second angling pulley 71 on body frame 20, and thence by end part 72 to extension spring 73, rigidly carried by vehicular frame 20, preferably in sheave 74. The tension in spring 73 carries some of the weight of the elevator assembly to allow it to be more readily moved upwardly in response to the minor terrain variations. To further aid in this function, elevator wheel 75 (FIGURE 5) journaled on stud shaft 76 carried by wheel frame 77 is provided at the lowermost lateral forward corner of housing 42 to provide a rolling contact with the ground thereunder and avoid structural damage to the chute by engagement with ground projections when the vehicle is in motion.

Figure 7:
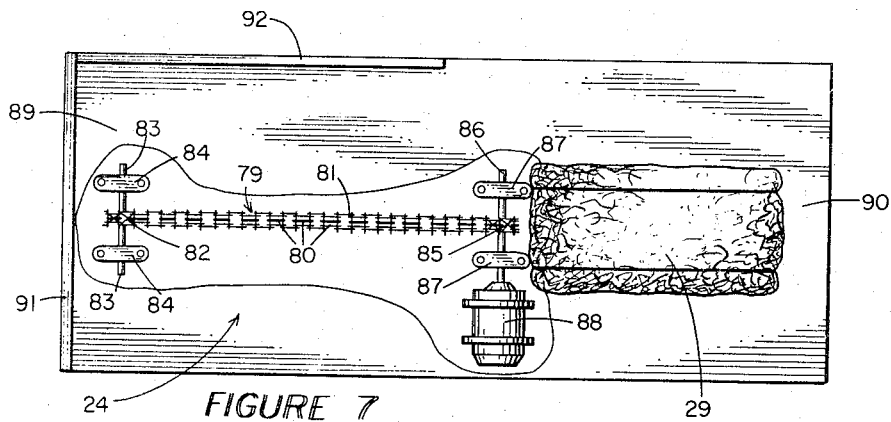
FIGURE 7 is a detailed, partially cutaway top view of the transfer deck and conveyor extending from the elevator to the first pusher deck.

Transfer deck 24 is a transverse planar structure communicating laterally from hood 43 of elevator 23 to bale cart 26. It is supported immediately below operating deck 22 by secondary frame 78 carried upon vehicular frame 20. This deck is best shown in its entirety and relative position in FIGURE 1, but in detail of operation in FIGURE 7.

It carries, in its part adjacent elevator 23, medial transversely extending endless transfer chain 79 having perpendicularly projecting dogs 80 adapted to physically engage the structure of a bale and move it correspondingly to chain motion. Chain 79 is of a link type with upper portion 81 positioned with cogs 80 projecting above the surface of transfer deck 24. It is carried upon outer idler cog wheel 82 on stud shaft 83 journaled in bearings 84. The inner part of chain 79 is carried upon driving cog 85 on stud shaft 86, journaled in bearings 87 and driven by hydraulic motor 88. This chain is preferably in constant motion during operation of the machine to transfer bales as presented from elevator end 89 to transfer portion 90 of the transfer deck. Appropriate side shield 91 and front shield 92, extending between elevator and transfer deck, are provided to maintain bales on the transfer deck and prevent their passing off the peripheral edges. The inward extension of the transfer chain should be such that a bale will remain lengthwise on the transfer table without passing laterally passed second pusher 27. Preferably all operating structures are maintained on the underside of the transfer table, as illustrated.

Figure 8:
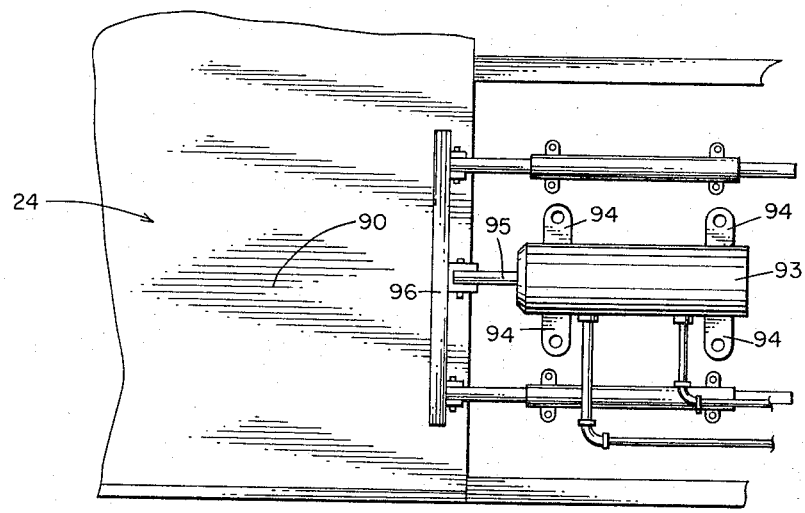
FIGURE 8 is a detailed, partial top view of the first pusher and its associated deck.

First pusher member 25 is illustrated in overall positioning in FIGURE 1 and in operative detail in FIGURE 8. This member comprises double-acting hydraulic cylinder 93 mounted by brackets 94 on the underside of operating deck 22 and positioned for piston extension in a rearward direction over pusher deck 24. Cylinder piston rod 95 is joined to cross push bar 96 in such fashion that the bar rests at the forward edge of transfer portion 90 of transfer table 24 when non-extended and yet is potentially extensible, rearwardly, completely across the transfer portion. Hydraulic cylinder 93 is activated by hydraulic control 40b on the operation deck.

Bale cart 26 is shown in its gross aspect in FIGURE 1 and in detail in FIGURES 12 and 13. The cart is of general rectangular shape having structural peripheral underframe 97, rotatably journaling four depending wheels 98 for locomotion on its supporting underframe. Top 99 of the transfer cart is pivotably mounted to the cart underframe by jack shafts 100 rotatably communicating between the forwardly extending part 101 of the underframe and depending ears 102 of top member 99. This structure is such as to allow top member 99 to be rotated into a slightly greater than vertical position with respect to the underframe 97. Hydraulic cylinder 103 is pivotably mounted on the cart frame between ears 104 of cart cross pieces 105. Piston rod 106 of this cylinder extends to the underside of top member 99 where it is rotatably mounted by shaft 107 rotatably extending between ears 108 structurally carried by the underside of top member 99. This cylinder 103 is of the commercial double-acting type, controlled from the operation deck by hydraulic control rod 40c, to raise and lower cart top member 99.

Secondary supporting underframe 109 communicates with vehicular frame 20 to support bale cart tracks 110. These tracks are paired, opposed flat members of the angled shape shown in FIGURE 13 to allow the loaded bale cart to move, after starting, rearwardly thereover by gravity to deposit its cargo on bale stacker 28. Upper surfaces 111 of tracks 110 are flush with the upper surface of bale stacker 28 to provide a smooth passage for the bale cart over the juncture between such members. Dimensioning of the cart is preferably such that it will hold twelve bales in six rows of two bales each, positioned with their longer dimensions transverse to the vehicle axis; with this dimensioning the apex 112 of tracks 110 is preferably axially parallel with and vertically below the center of gravity of the loaded bale cart when it is in loading position with its forward edge immediately adjacent to the rearward edge of transfer table 24, all as illustrated in FIGURE 13. With this arrangement, the cart when loaded can, upon appropriate starting motion, pass by gravity rearwardly to bale stacker 28. A central channel member 113, supported by secondary underframe 109, constituting an extension of the similar member carried by bale stacker 28, is provided to maintain alignment of bale cart 26 by engaging the downwardly depending alignment flange 114.

The tipping mechanism of bale cart 26 is best shown in FIGURE 6. It comprises catch member 115 slideably traveling in central channel 116 of catch channel member 117. The catch member communicates with one end of cable 118 which passes lengthwise rearwardly through the catch channel about rearward pulley 119 journaled on axle 120 on vehicular frame 20 to extension spring 121 carried in spring sheath 122 by the vehicular frame.

Catch 115 is releasably positioned in catch channel 116 to be released by mechanical activation of control 40d on the operation deck. When the catch 115 is in the position illustrated in FIGURE 6, spring 121 is under tension sufficient to urge cart 26 over the rise of tracks 110 until gravity causes the cart to move rearwardly over the supporting tracks to bale stacker 28. Catch 115 is preferably spring biased to a catching position and mechanically releasable therefrom by a pawl as well known in the art.

Figure 9:
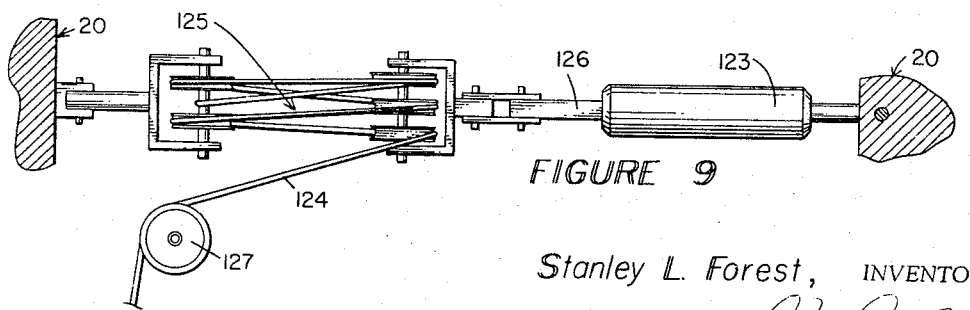
FIGURE 9 is a detailed view of the linkage mechanism of the hydraulically operated carriage cable system.

As shown in FIGURE 9, cart 26 is returned to its loading position by single-acting hydraulic cylinder 123 acting through cable 124 and multiple pulley systems 125, adapted to magnify the lineal motion of the cable over that of piston rod 126 of the cylinder approximately eight to one. Cable 124 passes from the pulley systems about direction changing pulley 127 to communicate with the forward part of cart 26 in catch channel 116. Hydraulic cylinder 123 is activated from the operation deck by hydraulic control 40e, and carried by the frame structure 20.

The second pusher system, illustrated in gross in FIGURE 1 and in detail in FIGURES 12 and 13, is carried by bale cart 26. Appropriate channels 128 are provided in top 99 of the cart to provide for lateral movement of pusher uprights 129. Channel members 130 are provided on the undersurface of the cart top immediately below channels 128 to slideably engage enlarged portions 131 carried by the lower part of uprights 129. Cross arm 132 communicates between the lowermost part of enlarged portions 131 to join them as a functional unit, and pusher bar 133 communicates between the inner surfaces of the upper portion of pusher uprights 129 to form a pushing surface. The pusher member is activated by double-acting hydraulic cylinder 134, structurally positioned on the undersurface of the top member. Piston rod 135 engages the cross arm 132 to transmit motion of the cylinder piston to the pusher member. Cylinder 134 is controlled by hydraulic control 40f on the operation deck.

Bale stacker 28 is illustrated in gross bestly in FIGURE 1. It comprises the rearward portion of my machine and includes the flat, planar bed 136 and substantially perpendicularly projecting rear-gate, stacking teeth 137 with push-off device 138 in the rearward part of the bed.

Bed 136 must be capable of holding substantial weights and I therefore prefer to construct it with internal structural framework well known in the art and therefore not illustrated in detail in the drawings. It should have a substantially flat, planar upper surface 139 to appropriately support baled products carried thereon. Central channel member 140 is provided in a forwardly-rearwardly extending medial position communicating with central channel member 113 of the cart supporting underframe to provide a continuous passage way for alignment flange 114 of bale cart 26 to maintain the cart in alignment as it passes on the bed.

Appropriate paired mortises 141 to receive the arms of push-out device 138 are provided in the rearward portion of the bed laterally of the central channel member 140, and a transverse mortise 142 is provided at its rearward edge to receive pushing rod 161, so that no part of the push-out device will project upwardly above the surface of bed 136 to interfere with the passage of bale cart 26 thereover or the stacking of bales thereon.

Stacker teeth 137 are flat, elongate, preferably slightly tapered members, providing a rearward surface to stop and support bales carried by the bale stacker. These members again must be of substantial structural rigidity to serve their purpose and are preferably joined to the rearwardmost edge of the bale stacker in a pivotable fashion by transverse rods 143 extending between appropriate holes in the teeth 137 and alternate ears 144 provided in the rear surface of bale stacker 28 to provide a changeable member with slight pivotable rotation between the member and the bed to aid in stacking bales carried thereby and removing them therefrom.

Figure 3:
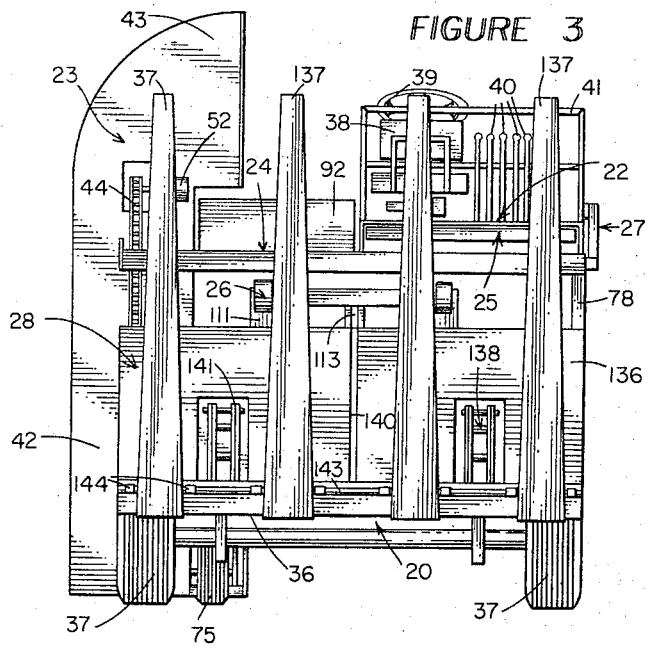
FIGURE 3 is an orthographic rear view of the invention shown in FIGURE 1.

Stacking bed 136 is pivotably carried in a normally slightly rearwardly sloping fashion upon vehicular frame 20 by axle 145 rotatably extending between ears 146 on the underside of bed 136 and through the rearwardmost extension of side beams 35 of vehicular frame 20, as illustrated particularly in FIGURES 3 and 6. This structure must also be of substantial rigidity because of the heavy loads carried by the stacking bed 136. Bed 136 is moved pivotably about its axle by paired, similar double-acting hydraulic cylinders 147 rotatably journaled upon pins 148 extending between ears 149 carried by structural cross members 36a on one end and pins 150 rotatably communicating between the end part of piston shaft 151 and ears 152 structurally carried by the underside of bed 136. With this structure the hydraulic cylinders 147 may be activated by hydraulic control 40g on the operation deck to pivot stacking bed 136 rearwardly slightly passed vertical to unload stacked bales carried thereby.

The push-off arm is best shown in FIGURE 11. It is a scissor-like member having inner arm 153 pivotably journaled by body pin 154 about a transversely extending axis, relative to bed 136 of the bale stacker. This inner arm at its outer extension rotatably communicates by pin 155 to outer arm 156. Double-acting hydraulic cylinder 157 pivotably communicates by its cylinder portion to inner arm 153 by pin 158 and by its piston arm 159 to pin 160 journaled in the outer portion of outer arm 156.

Similar paired pusher arms are positioned laterally on each side of central channel member 140 and communicate by pusher rod 161 extending between the outermost extension of each outer arm 156 of the pair. Hydraulic cylinder 157 is activated from the operation deck by hydraulic control 40h to move pusher rod 161 from its non-extended position (dotted) within the bed 136 of the bale stacker to the extended position illustrated in solid line in FIGURE 11 to remove bales carried by the tilted bale stacker and position them upon some suitable receiving surface.

The hydraulic system of my invention is best illustrated in the diagram of FIGURE 10. Pump 162 forces hydraulic fluid under some pressure to reservoir 163. The reservoir communicates to primary adjustable flow divider 164 from whence its flow is distributed through circuit 166 to secondary flow divider 167. The circuit 165 communicates in parallel to main bed lift switch 40g and cylinder 147, push-off valve 40h and push-off cylinder 157, elevator lift valve 40a and cylinder 61, and elevator and conveyor off-on valve 168, thence to return circuit 169 communicating with pump 162. The circuit 166 communicates to secondary adjustable flow divider 167 from which it is adjustably distributed to hydraulic circuit 170 and steering orbit 171. Hydraulic circuit 170 communicates again in parallel to cart bed lift valve 40c and cylinder 103, second pusher valve 40f and hydraulic cylinder 134, first pusher valve 40b and cylinder 93, and one way cart table valve 40d and cylinder 123, thence communicating to return circuit 169. Steering orbit 161 communicates through hydraulic steering system 172 of standard design and thence to return line 169 to complete the hydraulic circuitry.

Preferably the hydraulic circuit has a reserve capacity of at least 25 gallons of fluid with pump 162 capable of delivering at least 40 gallons per minute at a pressure of approximately twelve-hundred pounds. Obviously from the motions involved, many of the hydraulic connections must be by moveable lengths of flexible hydraulic hose to allow for the motions provided for the various members of my device.

The operation of my invention is best shown in the semi-diagrammatic illustrations of FIGURE 14. Elevator 23 is adjusted to appropriate height for existing conditions, so that its wheel 75 will run along the ground traversed by the vehicle. The vehicle is then driven about the field containing randomly disbursed bales and a bale approached so that it is presented somewhat lengthwise to the lower portion of elevator chute opening 54, between lateral extensions of pick up assembly 53. The bale is approached until contacted by dogs 45 of chain 44 and raised upwardly thereby within elevator housing 42. After the bale is in the elevator, the machine may again be maneuvered to pick up a second bale.

The bale within the elevator is maintained in contact with the dogs 45 of the chain 44 by pressure bar 55 acting on its forward surface and is raised thereby; the bale moves upward in the elevator until its top portion is turned laterally inward by the upper inner surface of hood 43, and as it passes from the elevator hood it is deposited on the transfer table with some part over transfer chain 79 and with its length substantially transverse to the machine.

The bale now becomes engaged with dogs 80 of transfer chain 79 and is moved laterally to transfer portion 90 of the transfer table. To this point it is to be noted that the movement of the bale is continuous without operator attention, except as to its pick up, so long as the elevator and transfer motors are running. From this point onward the operation is manual.

With the bale on transfer portion 90 of the transfer table, first pusher 25 is activated to move the bale onto the forward portion of the bale cart 26, rearwardly adjacent thereto, to make room for another bale on transfer portion 90 of the transfer table. This operation is continued with another bale, it being positioned in similar fashion and pushed onto the bale cart 26, moving the first bale back another space. The operation is continued until a row of six bales, extending in a forward-rearward direction, is thusly positioned on the bale cart. Second pusher 27, carried by the bale cart, is then activated to move the row of six bales laterally across the bale cart to the edge most distal from the pusher side of the cart. The cart filling operation then continues to place six more bales in the space vacated by the first six. At this time the bale cart will have upon it twelve bales arranged in two rows of six each with the length dimension of the bales transverse to the cart motion.

Upon filling of the cart, cart catch 115 is manually activated to release the bale cart. Tension in spring 121 causes the cart to move rearwardly over apex 112 of cart tracks 110 and pass by gravity along the rearwardly sloping tracks and rearwardly sloping bale stacker deck to the rearwardmost unoccupied portion of it where the cart will be stopped by the row of bales in place thereon or the rear gate, as the case may be, as shown in FIGURE 14a.

At this point hydraulic cylinder 103 is activated to raise the cart top to a slightly passed vertical position. During this operation the second pusher remains activated to maintain some lateral pressure on the bales on the cart so that they will not prematurely fall therefrom. When the cart is in the position illustrated in FIGURE 14b, with the bales carried by it positioned vertically against those already in position resting against rear gate stacking teeth 137, second pusher 27 is manually relaxed to allow the bales carried on the cart to be released by gravity therefrom. The top of cart 26 is then lowered to its normal position and the cart thereupon returned to its loading position rearwardly adjacent transfer table 24. This operation is again repeated until ten rows of twelve bales each are in position upon bale stacker 28 to make a total of one hundred twenty bales.

Upon the filling of the bale stacker, or sooner if desired, the entire vehicle is moved to a stacking site whereupon the bale stacker is rotated rearwardly by hydraulic cylinders 147 to the position illustrated in FIGURE 14c. The load held principally by the rear gate teeth is finally positioned at the place desired by appropriate motion of the vehicle, if this has not been previously done. The stacker is rotated completely rearward, slightly passed vertical, until the slight pivotable motion between bale stacker bed 136 and teeth 137 permits at least the outermost portion of the bales supported thereby to rest on the earth. In this position, the push-off device 138 is activated, the cylinder 157 pushing the bottom-most layer of bales outwardly, or more properly speaking, pushing the vehicle away from the outermost layer of bales, to remove the stacking teeth 137 from underneath the stack. After the teeth are partially removed from under the stack by pusher 138, the vehicle itself may be activated to remove or aid in removing them from the outermost portion of bales.

Upon completion of this operation, there then will be a stack of one hundred twenty bales in a pile, ten bales high, six bales thick, and two bales, lengthwise, wide, and the device will be fully unloaded and ready to complete another loading cycle.

Obviously from what has been said, if it be desired to position bales other than as recited, for pile tieing purposes or otherwise, many various arrangements can be made, some by appropriate manipulation of the hydraulics of my device and others by manual manipulation of some of the bales.

From the foregoing description it is to be noted that during the loading operation the load on the vehicle will be concentrated in its rearward portion and supported for the most part by the rear tires of the vehicle. This is to be desired as it provides additional traction for the vehicle when needed.

It is further to be noted that from the structure recited bed 136 of the bale stacker slopes downwardly to the rear. This again is a desirable feature in bale loading devices as it permits the device to operate down hill on relatively steep inclines approaching the degree of inclination of bed 136 to the vehicular frame member 20. In other structures not having this angled relationship, the vehicle may not be operated down hill without tipping stored bales, which under many conditions is a decided disadvantage.

It is further to be noted from the structure described that after a bale has been positioned on transfer portion 90 of the transfer deck, the operations with it are activated and controlled entirely by the operator and are not automatic. This feature has been found desirable over existing automatic or semi-automatic art in that it substantially lessens the possibility of accident resulting in damage to the machinery or injury of the operator.

It is further to be noted from the structure described that if the operations be improperly sequenced by accident, there will not be projecting parts or portions of the machine which will be broken or otherwise damaged.

From the structure recited, it is also to be noted that the vehicle can be constructed as specified and yet maintain an overall width under eight feet, which permits the device to be operated over public roadways under normally existing regulations. Other structural features of the device are also compatible with such operation.

It is also to be noted that the operator is positioned in a high forward location wherefrom he has a good view of the terrain being traversed and all of the various operations of the machine. The machine also may be completely operated by one operator and experience has proven that the invention will load approximately three hundred sixty bales, or eighteen tons, per hour with one operator.

The foregoing description of my invention is necessarily of a detailed, particular character so that a specific embodiment of it may be set forth as required, but it is to be understood that various modifications, changes, multiplications and substitutions of parts may be made without departing from its spirit, essence or scope.

Having thusly described my invention, what I claim is:

1. A bale loading and stacking device of the nature aforesaid comprising, in combination:
    a steerable vehicle having a prime mover supplying power for motion and appurtenant systems carried thereon;
    an operation deck, in a forward upper position thereon, having centralized operating controls accessible therefrom;
    an elevator structure, in the forward position, having means to convey bales presented thereto to a transfer deck adjacent the upper part thereof;
    a transfer deck communicating transversely from the upper portion of said elevator to a bale cart rearwardly adjacent thereto, said deck having first means of conveying bales therealong to a medial transfer portion and second means of transferring bales therefrom to a bale cart;
    a bale cart adjacent said transfer deck moveable therefrom to and onto a rearwardly positioned bale stacker, said cart having means of laterally and vertically positioning bales thereon;
    a bale stacker pivotably communicating with said vehicular frame, adapted to receive an array of bales from said bale cart and store them;
    means of rotating said bale stacker rearwardly to deposit bales carried thereby upon a supporting surface; and
    a pusher means of separating said vehicle from said deposited bales.

2. The invention of claim 1 further characterized by said bale cart being rollably supported on angled tracks, the rear part thereof rearwardly sloping to cause a loaded cart to move rearwardly thereover to said bale stacker under action of gravity upon activation by spring biasing means.

3. The invention of claim 1 further characterized by said means of separating said vehicle from an array of deposited bales comprising spaced similar scissor-like members each having an inner arm pivotably communicating with an outer arm with hydraulic means therebetween to cause pivotal motion to extend said outer arm from said inner arm and a pusher bar communicating between said outer arms, said pusher structure being carried in the rearward part of said stacker.

4. The invention of claim 1 further characterized by said elevator structure having vertically disposed rails slidably engaged by vertically disposed mating channels carried by said vehicle with hydraulic means to raise and lower said elevator and spring means to allow slight vertical movement thereof responsive to minor local vertical changes in surfaces traversed.

5. The invention of claim 1 further characterized by said bale stacker having a planar rearwardly sloping bed with perpendicularly upwardly extending stacking teeth slightly pivotably communicating with the rearward periphery thereof, said bed being pivotably mounted on said vehicle frame with hydraulic means communicating therebetween to rotate said bed slightly more than vertical relative said vehicle.

References Cited
UNITED STATES PATENTS

| | | |
|---|---|---|
| 2,508,698 | 5/1950 | Von Beren. |
| 2,848,127 | 8/1958 | Grey. |
| 3,278,050 | 10/1966 | Tarbox. |

GERALD M. FORLENZA, *Primary Examiner.*

ROBERT SPAR, *Assistant Examiner.*